(12) United States Patent
Chen et al.

(10) Patent No.: US 11,710,879 B2
(45) Date of Patent: Jul. 25, 2023

(54) METHOD AND APPARATUS FOR WELDING FOILS

(71) Applicant: GM GLOBAL TECHNOLOGY OPERATIONS LLC, Detroit, MI (US)

(72) Inventors: Chih-chang Chen, Rochester Hills, MI (US); Teresa J. Rinker, Royal Oak, MI (US); Hongliang Wang, Sterling Heights, MI (US); Eric G. Hartnagle, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 17/228,868

(22) Filed: Apr. 13, 2021

(65) Prior Publication Data

US 2022/0328938 A1 Oct. 13, 2022

(51) Int. Cl.
*B23K 20/00* (2006.01)
*H01M 50/536* (2021.01)
*B23K 20/10* (2006.01)
*B23K 26/70* (2014.01)
*B23K 26/24* (2014.01)
*B23K 101/36* (2006.01)

(52) U.S. Cl.
CPC ........... *H01M 50/536* (2021.01); *B23K 20/10* (2013.01); *B23K 26/24* (2013.01); *B23K 26/702* (2015.10); *B23K 2101/36* (2018.08)

(58) Field of Classification Search
CPC ............... B23K 15/0006; B23K 15/10; B23K 2101/38; B23K 26/0093; B23K 26/22; B23K 26/244; B23K 26/32; H01M 50/516
See application file for complete search history.

(56) References Cited

U.S. PATENT DOCUMENTS

| | | | | |
|---|---|---|---|---|
| 9,505,082 B2 * | 11/2016 | Murakami | ........... | H01M 50/534 |
| 9,865,861 B2 * | 1/2018 | Kim | .................... | H01M 50/209 |
| 9,905,892 B2 * | 2/2018 | Merriman | ............. | B23K 26/32 |
| 11,171,391 B2 * | 11/2021 | Dawley | ............... | H01M 50/516 |
| 11,411,224 B2 | 8/2022 | Takabayashi | ......... | H01M 4/661 |
| 11,446,764 B2 * | 9/2022 | Närhi | ..................... | B23K 26/21 |
| 2012/0070720 A1 * | 3/2012 | Aizawa | ............... | H01M 50/533 429/163 |
| 2013/0029206 A1 * | 1/2013 | Lev | ..................... | H01M 50/522 429/161 |
| 2014/0227576 A1 * | 8/2014 | Meintschel | ......... | H01M 50/512 429/178 |
| 2019/0305285 A1 * | 10/2019 | Tao | ........................ | B23K 26/32 |
| 2021/0299785 A1 * | 9/2021 | Närhi | ..................... | B23K 26/22 |

* cited by examiner

*Primary Examiner* — Erin B Saad
(74) *Attorney, Agent, or Firm* — Quinn IP Law

(57) ABSTRACT

A method and associated device for joining a battery cell tab to a plurality of foils associated with a plurality of electrodes of a battery cell are described. This includes arranging the plurality of foils in a stack, and joining, via a first joining device, the plurality of foils, wherein the first joining device defines a joining region. A portion of the battery cell tab is arranged on the plurality of foils, and joined, via a second joining device, to the plurality of foils. The second joining device generates a weld joint that is encompassed within the joining region defined by the first joining device. In doing so, weld quality and strength of internal welds in a battery cell may be improved by reducing the occurrence of porosities and cracks in the foil/tab weld joints.

17 Claims, 5 Drawing Sheets

METHOD AND APPARATUS FOR WELDING FOILS

INTRODUCTION

Lithium ion battery packs for vehicle and other high-power applications may include multiple lithium ion battery cells that are electrically connected together. Each cell includes a plurality of lithium ion electrode pairs that are enclosed within a sealed pouch envelope. Each electrode pair includes a negative electrode, a positive electrode, and a separator that physically separates and electrically isolates the negative and positive electrodes. To facilitate lithium ion mobility, an electrolyte that conducts lithium ions may be present within the separator. The electrolyte allows lithium ions to pass through the separator between the positive and negative electrodes to counterbalance the flow of electrons that, during charge and discharge cycles of the lithium ion battery cell, circumvent the separator and move between the electrodes through an external circuit. Depending on their chemistry, each lithium ion battery cell has a maximum or charging voltage (voltage at full charge) due to the difference in electrochemical potentials of the electrodes. For example, each lithium ion battery cell may have a charging voltage in the range of 3V to 5V and a nominal open circuit voltage in the range of 3.5V to 4V. Lithium ion battery cells may be connected in series, in parallel, or in series and in parallel depending on the specified battery pack design.

The plurality of electrode pairs are electrically connected in parallel to electrochemically store and release electric power. Each electrode pair includes an anode and a cathode with a separator disposed in between. Each anode has an anode current collector with a negative foil, and each cathode has a cathode current collector with a positive foil. The negative foils of the anodes of the plurality of electrode pairs are electrically connected in parallel and electrically connected to a negative terminal tab that protrudes through the pouch, and the positive foils of the cathodes of the plurality of electrode pairs are electrically connected in parallel, and electrically connected to a positive terminal tab that protrudes through the pouch.

Within each battery cell, the negative terminal tab electrically communicates with the negative current collectors that contact and exchange electrons with the negative electrodes of the electrode pairs, and the positive terminal tab electrically communicates with the positive current collectors that contact and exchange electrons with the positive electrodes of the electrode pairs. Lithium-ion battery cells are capable of being discharged and re-charged over many cycles.

The negative foils of the anodes of the plurality of electrode pairs may be electrically connected in parallel and electrically connected to the negative terminal tab using laser welding. Likewise, the positive foils of the anodes of the plurality of electrode pairs may be electrically connected in parallel and electrically connected to the positive terminal tab using laser welding.

Laser welding is a metal joining process in which a laser beam is directed at a stack of metal workpieces to provide a concentrated energy source capable of generating a fusion weld joint between the overlapping constituent metal workpieces. Layers of metal workpieces may be stacked and aligned relative to one another such that their faying surfaces overlap to establish a faying interface (or faying interfaces) within an intended weld site. A laser beam is then directed at or near a top surface of the workpiece stack. The heat generated from the absorption of energy that is supplied by the laser beam initiates melting of the metal workpieces and establishes a molten weld pool within the workpiece stack. The molten weld pool penetrates through the metal workpiece impinged upon by the laser beam and into the underlying metal workpiece or workpieces to a depth that intersects with all of the established faying interfaces. The laser beam rapidly generates a molten weld pool upon impinging the top surface of the workpiece stack. This molten weld pool solidifies to form a weld joint that is composed of re-solidified materials from all the layers of the metal workpieces. Such fusion of the material from the overlapping layers of the metal workpieces forms a weld joint.

Porosities and/or cracks are known to form along a laser weld fusion line of the foils due to the moistures absorbed by the oxides on foil surfaces and tab surfaces. Ultrasonic pre-welding of foils serves to consolidate the foils, and remove some or all of the absorbed moistures and some oxides. Subsequently, laser welding of tab/foils aimed at the pre-welded locations will result in welds with reduced porosities/cracks. Localized material voids, which may be manifested as gaps between layers in the workpiece stack and/or as voids in one or more of the workpieces may affect service life of the weld joint, and hence affect service life of the component that includes the weld joint. When the workpiece stack includes a plurality of foils that are welded to a battery tab, the occurrence of localized material voids may compromise the strength of the weld joint and affect electrical conductivity between one or more of the foils and the battery tab.

There is a need to improve quality of weld joints that are generated by laser welders by reducing occurrences of porosities and cracks, especially in laser welding of aluminum foils employed in battery cell electrodes.

SUMMARY

A method and associated device for joining a battery cell tab to a plurality of foils associated with a plurality of electrodes of a battery cell are described. This includes arranging the plurality of foils in a stack, and joining, via a first joining device, the plurality of foils, wherein the first joining device defines a joining region. A portion of the battery cell tab is arranged on the plurality of foils, and joined, via a second joining device, to the plurality of foils. The second joining device generates a weld joint that is encompassed within the joining region defined by the first joining device. In doing so, weld quality and strength of internal welds in a battery cell may be improved by reducing the occurrence of porosities and cracks in the foil/tab weld joints.

An aspect of the disclosure includes joining, via the first joining device, the plurality of foils by ultrasonically welding the plurality of foils.

Another aspect of the disclosure includes ultrasonically welding the plurality of foils by placing the plurality of foils arranged in the stack on an anvil, clamping the plurality of foils arranged in the stack, and applying, via an ultrasonic welding horn, ultrasonic force to the plurality of foils arranged in the stack to form the joining region.

Another aspect of the disclosure includes identifying, via a vision system, the joining region on the plurality of foils arranged in the stack; and determining a spatial location of the joining region on the plurality of foils arranged in the stack. The weld joint generated by the second joining device is encompassed within the spatial location of the joining region defined by the first joining device.

Another aspect of the disclosure includes the joining region defined by the first joining device being a rectangular area.

Another aspect of the disclosure includes joining, via the second joining device, the portion of the battery cell tab to the plurality of foils by welding, via a laser welder, the portion of the battery cell tab to the plurality of foils to generate the weld joint.

Another aspect of the disclosure includes a top surface of the battery cell tab being proximal to the laser welder, and generating, via the laser welder, a laser beam that is directed within the joining region defined by the first joining device to form the weld joint joining the foils and the battery cell tab.

Another aspect of the disclosure includes the weld joint generated by the second joining device being a seam weld that is encompassed within the joining region defined by the first joining device.

Another aspect of the disclosure includes the seam weld being a continuous straight line seam weld joint that is encompassed within the joining region defined by the first joining device.

Another aspect of the disclosure includes the seam weld being a waveform seam weld joint that is encompassed within the joining region defined by the first joining device.

Another aspect of the disclosure includes a weld joint generated by the second joining device being at least one spot weld that is encompassed within the joining region defined by the first joining device.

Another aspect of the disclosure includes arranging the portion of the battery cell tab overtop of the plurality of foils in relation to the second joining device.

Another aspect of the disclosure includes arranging the portion of the battery cell tab underneath the plurality of foils in relation to the second joining device.

Another aspect of the disclosure includes a method for joining a plurality of foils associated with a plurality of electrodes of a battery cell and a battery cell tab that includes arranging the plurality of foils in a stack, joining, via a first joining device, the plurality of foils, wherein the first joining device defines a plurality of joining regions, arranging a portion of the battery cell tab on the plurality of foils, and joining, via a second joining device, the portion of the battery cell tab to the plurality of foils, wherein the second joining device generates a plurality of weld joints. Each of the plurality of weld joints generated by the second joining device is encompassed within a respective one of the plurality of joining regions defined by the first joining device.

Another aspect of the disclosure includes identifying, via a vision system, the plurality of the joining regions on an upper surface of the plurality of foils arranged in the stack, determining a plurality of spatial locations for the plurality of the joining regions on an upper surface of the plurality of foils arranged in the stack and welding, via a laser welder, the portion of the battery cell tab to the plurality of foils to generate the plurality of weld joints, wherein each of the plurality of weld joints is encompassed within a respective one of the plurality of the spatial locations for the plurality of the joining regions on the upper surface of the plurality of foils arranged in the stack.

Another aspect of the disclosure includes forming a void region between the battery cell tab and the plurality of foils at each of the plurality of joining regions.

Another aspect of the disclosure includes a battery cell, which includes a plurality of battery electrode pairs arranged in a stack, wherein each of the electrode pairs includes an anode arranged on an anode current collector, a cathode arranged on a cathode current collector, and a separator; and a first battery cell tab and a second battery cell tab. The cathode current collectors for the plurality of battery electrode pairs are arranged in a first stack that is electrically and mechanically joined to the first battery cell tab at a first joining region. The first stack of the cathode current collectors is electrically and mechanically joined to the first battery cell tab via a first weld joint that is encompassed within the first joining region.

Another aspect of the disclosure includes the first battery cell tab and the cathode current collectors being fabricated from aluminum.

Another aspect of the disclosure includes the anode current collectors for the plurality of battery electrode pairs being arranged in a second stack that is electrically and mechanically joined to the second battery cell tab at a second joining region. The second stack of the anode current collectors is electrically and mechanically joined to the second battery cell tab via a second weld joint that is encompassed within the second joining region.

Another aspect of the disclosure includes the second battery cell tab and the anode current collectors being fabricated from copper.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Furthermore, some of the drawings may be described with reference to an xyz-reference frame for ease of understanding, which is illustrated in the various drawings and consistent between the various drawings, wherein x indicates a lateral dimension, y indicates a longitudinal dimension, and z indicates an elevation dimension. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Figure 1:
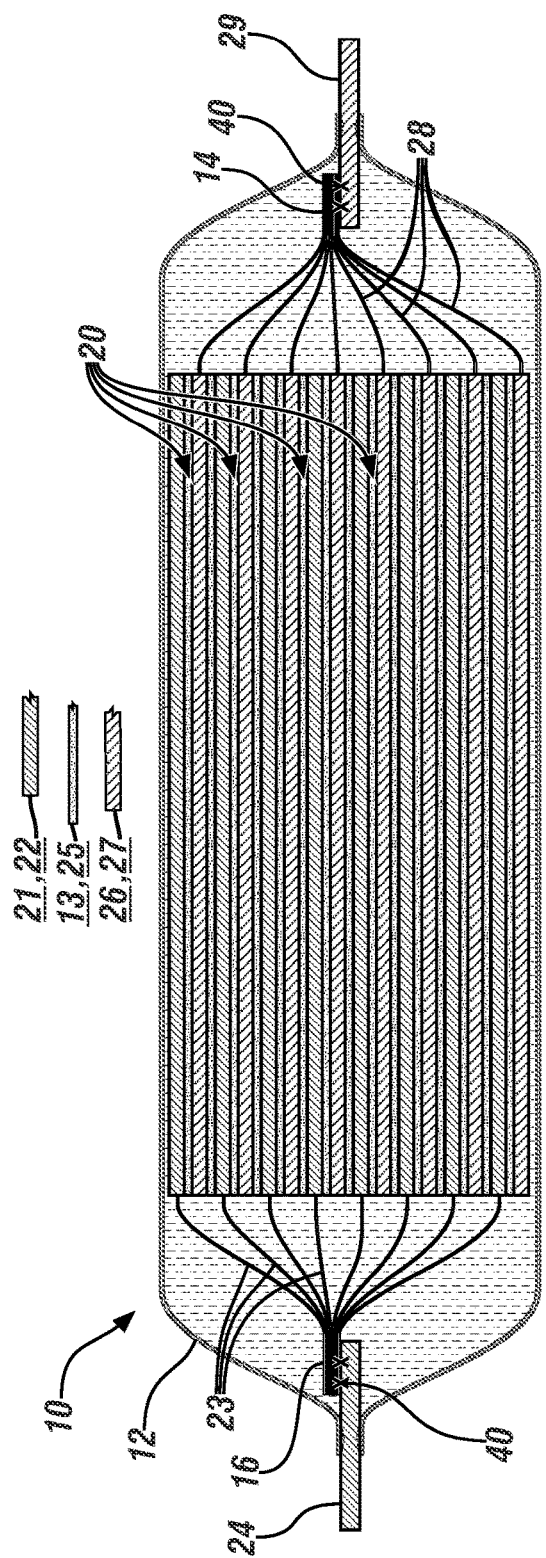
FIG. 1 schematically shows a cutaway side-view of a battery cell that includes positive and negative battery tabs and electrode pairs that are arranged in a stack, in accordance with the disclosure.

Referring to the drawings, wherein like reference numerals correspond to like or similar components throughout the several Figures, FIG. 1 schematically illustrates an embodiment of a prismatically-shaped lithium ion battery cell 10 that includes a plurality of electrode pairs 20 that are arranged in a stack and sealed in a flexible pouch 12 containing an electrolytic material 13. A first, positive battery cell tab 29 and a second, negative battery cell tab 24 protrude from the flexible pouch 12. Each of the electrode pairs 20 includes an anode 21 arranged on an anode (or negative) current collector 22, and a cathode 26 arranged on a cathode (or positive) current collector 27, and are separated by a separator 25. The cathode current collector 27 is fabricated from aluminum or an aluminum alloy, and includes a positive foil (or cathode foil) 28. The anode current collector 22 is fabricated from copper, a copper alloy, or another material, and includes a negative foil (or anode foil) 23.

The negative and positive current collectors 22, 27 are thin metallic plates that contact their respective negative and positive electrodes 21, 26 over an appreciable interfacial surface area. The purpose of these metal current collectors 22, 27 is to exchange free electrons with their respective negative and positive electrodes 21, 26 during discharging and charging of the electrode pairs 20. The thickness of each of the negative and the positive current collectors 22, 27 may be between 5 um and 22 um. To facilitate the collective distribution and flow of electrons, each of the negative current collectors 22 includes the negative foil 23, and each of the positive current collectors 27 includes the positive foil 28.

The negative foils 23 protrude away from the electrode pairs 20 and are positioned in overlapping alignment with one another, and the positive foils 28 also protrude away from the electrode pairs 20 and are positioned in overlapping alignment with one another. The aligned sets of negative and positive foils 23, 28 are separated from each other either on different sides of the electrode pairs 20 (as shown), or are on the same side of the electrode pairs 20. The positive foil 28 of the cathode current collectors 27 are arranged in a first stack 14, and are electrically coupled and mechanically joined to the positive battery cell tab 29 in a manner that is described herein. The negative foils 23 of the anode current collectors 22 are arranged in a second stack 16, and are electrically coupled and mechanically joined to the second, negative battery cell tab 24.

The first, positive battery cell tab 29 is a planar sheet that is fabricated from aluminum or an aluminum alloy, and has a thickness at or near 0.4 mm. The second, negative battery cell tab 24 is a planar sheet that is fabricated from copper, a copper alloy, a nickel-coated copper, or another material, and has a thickness at or near 0.2 mm. The first and second battery cell tabs 29, 24 may have other features that are relevant to mechanical, electrical and packaging functions within a battery assembly.

Each of the electrode pairs 20 includes a positive electrode (or cathode) 26, a negative electrode (or anode) 21, and a separator 25 disposed between the positive and negative electrodes 26, 21 to physically separate and electrically insulate the positive and negative electrodes 26, 21 from each other. The electrolytic material 13 that conducts lithium ions is contained within the separator 25 and is exposed to each of the positive and negative electrodes 26, 21 to permit lithium ions to move between the positive and negative electrodes 26, 21. Additionally, the negative electrode 21 of each electrode pair 20 contacts and exchanges electrons with the anode current collector 22, and the positive electrode 26 of each electrode pair 20 contacts and exchanges electrons with the cathode current collector 27. The electrode pairs 20 are arranged in a stack so that each anode current collector 22 is interposed between a negative electrode 21 of one electrode pair 20 and a negative electrode 21 of an adjacent electrode pair 20 and, similarly, each cathode current collector 27 is interposed between a positive electrode 26 of one electrode pair 20 and a positive electrode 26 of an adjacent electrode pair 20. At least one, and, for vehicle applications, anywhere from one to one hundred electrode pairs 20 may be included in the flexible pouch 12.

The negative electrode 21 and the positive electrode 26 of each electrode pair 20 are fabricated as electrode material that is able to intercalate and deintercalate lithium ions. The electrode materials of the positive and negative electrodes 26, 21 are formulated to store intercalated lithium at different electrochemical potentials relative to a common reference electrode, e.g., lithium. In the construct of the electrode pair 20, the negative electrode 21 stores intercalated lithium at a lower electrochemical potential (i.e., a higher energy state) than the positive electrode 26 such that an electrochemical potential difference exists between the positive and negative electrodes 26, 21 when the negative electrode 21 is lithiated. The electrochemical potential difference for each battery cell 10 results in a charging voltage in the range of 3V to 5V and nominal open circuit voltage in the range of 3.5V to 4.0V. These attributes of the negative and positive electrodes 26, 21 permit the reversible transfer of lithium ions between the positive and negative electrodes 26, 21 either spontaneously (discharge phase) or through the application of an external voltage (charge phase) during operational cycling of the electrode pair 20. The thickness of each positive and negative electrode 26, 21 ranges between 30 um and 150 um.

The negative electrode 21 is a lithium host material such as, for example, graphite, silicon, or lithium titanate. The lithium host material may be intermingled with a polymeric binder material to provide the negative electrode 21 with structural integrity and, optionally, a conductive fine particle diluent. The lithium host material is preferably graphite and the polymeric binder material is preferably one or more of polyvinylidene fluoride (PVdF), an ethylene propylene diene monomer (EPDM) rubber, styrene butadiene rubber (SBR), a carboxymethyl cellulose (CMC), polyacrylic acid, or mixtures thereof. Graphite is normally used to make the negative electrode 21 because, in addition to being relatively inert, its layered structure exhibits favorable lithium intercalation and deintercalation characteristics that help provide the battery electrode pair 20 with a desired energy density. Various forms of graphite that may be used to construct the negative electrode 21 are commercially available. The conductive diluent may be very fine particles of, for example, high-surface area carbon black.

The positive electrode 26 is composed as a lithium-based active material that stores intercalated lithium at a higher electrochemical potential (relative to a common reference electrode) than the lithium host material used to make the negative electrode 21. The same polymeric binder materials (PVdF, EPDM, SBR, CMC, polyacrylic acid) and conductive fine particle diluent (high-surface area carbon black) that may be used to construct the negative electrode 21 may also be intermingled with the lithium-based active material of the positive electrode 26 for the same purposes. The lithium-based active material is preferably a layered lithium transition metal oxide, such as lithium cobalt oxide, a spinel lithium transition metal oxide, such as spinel lithium manganese oxide, a lithium polyanion, such as a nickel-manganese-cobalt oxide, lithium iron phosphate, or lithium fluorophosphate. Some other suitable lithium-based active materials that may be employed as the lithium-based active material include lithium nickel oxide, lithium aluminum manganese oxide, and lithium vanadium oxide, to name examples of alternatives. Mixtures that include one or more of these recited lithium-based active materials may also be used to make the positive electrode 26.

The separator 25 is composed as one or more porous polymer layers that, individually, may be composed of any of a wide variety of polymers. Only one such polymer layer is shown here for simplicity. Each of the one or more polymer layers may be a polyolefin. Some specific examples of a polyolefin are polyethylene (PE) (along with variations such as HDPE, LDPE, LLDPE, and UHMWPE), polypropylene (PP), or a blend of PE and PP. The polymer layer(s) function to electrically insulate and physically separate the negative and positive electrodes 21, 26. The separator 25 may further be infiltrated with a liquid electrolyte throughout the porosity of the polymer layer(s). The liquid electrolyte, which also wets both electrodes 21, 26, preferably includes a lithium salt dissolved in a non-aqueous solvent. The separator 25 has a thickness that may be between 10 um to 50 um.

The descriptions set forth above pertaining to the negative electrode 21, the positive electrode 26, the separator 25, and the electrolytic material 13 included within the separator 25 are intended to be non-limiting examples of those aspects of the electrode pair 20. Many variations on the chemistry of each of these elements may be applied in the context of the lithium ion battery cell 10 of the present disclosure. For example, the lithium host material of the negative electrode 21 and lithium-based active material of the positive electrode 26 may be compositions other than those specific electrode materials listed above, particularly as lithium ion battery electrode materials continue to be researched and developed. Additionally, the polymer layer(s) and/or the electrolyte contained within the polymer layer(s) of the separator 25 may also include other polymers and electrolytes than those specifically listed above. In one variation, the separator 25 may be a solid polymer electrolyte that includes a polymer layer, such polyethylene oxide (PEO), polypropylene oxide (PPO), polyacrylonitrile (PAN), or polyvinylidene fluoride (PVdF) having a lithium salt or swollen with a lithium salt solution. The electrode pair 20 reversibly exchanges lithium ions through the separator 25 and a flow of electrons around the separator 25 during applicable discharge and charge cycles.

Figure 2:
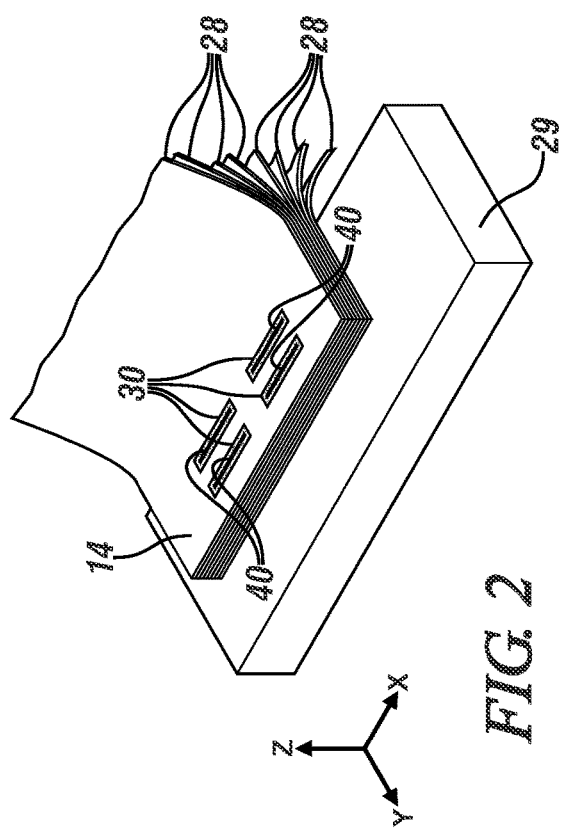
FIG. 2 schematically shows an isometric view of an arrangement that includes a battery tab underneath of a plurality of foils arranged in a stack, in accordance with the disclosure.

FIG. 2 illustrates the positive foils 28 of the cathode current collectors 27 arranged in the first stack 14 and placed overtop of a portion of the first, positive battery cell tab 29 for electrical coupling and mechanical joining thereto. Also illustrated are a plurality of joining regions 30 and a corresponding plurality of weld joints 40, wherein each weld joint 40 is encompassed within the corresponding one of the joining regions 30. Each of the joining regions 30 is formed by compressing and thus concentrating, in the z-dimension, the plurality of positive foils 28 of the cathode current collectors 27 in the first stack 14. Thus, the plurality of positive foils 28 of the cathode current collectors 27 in the first stack 14 are depressed in the z-dimension in relation to their positions elsewhere. In one embodiment, the joining regions 30 are formed by an ultrasonic welding process prior to placing the first stack 14 overtop of the positive battery cell tab 29.

In one embodiment, the weld joints 40 are formed within the joining regions 30 by a laser welding process to join the first stack 14 to the positive battery cell tab 29. Said another way, the positive foils 28 of the cathode current collectors 27 arranged in the first stack 14 are electrically coupled and mechanically joined to the positive battery cell tab 29 by the ultrasonic welding process followed by the laser welding process, wherein the weld joints 40 generated by the laser welding process are formed within and encompassed by the joining regions 30 that are generated by the ultrasonic welding process.

Figure 3:
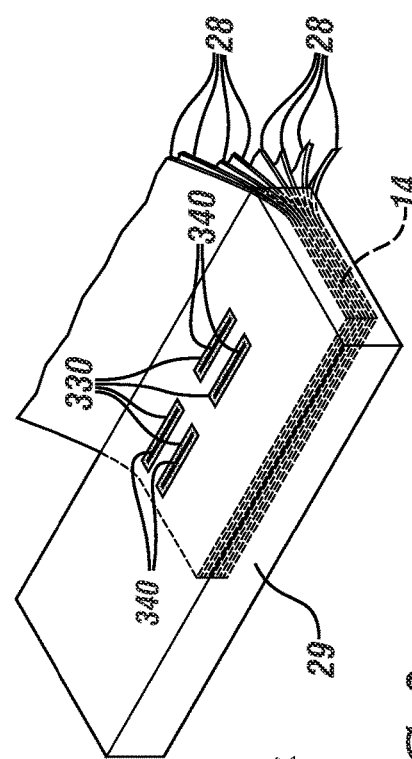
FIG. 3 schematically shows an isometric view of an arrangement that includes a battery tab overtop of a plurality of foils arranged in a stack, in accordance with the disclosure.

FIG. 3 illustrates the positive foils 28 of the cathode current collectors 27 arranged in the first stack 14 and placed underneath of a portion of the first, positive battery cell tab 29 for electrical coupling and mechanical joining thereto. Also illustrated are a plurality of joining regions 330 and a corresponding plurality of weld joints 340, wherein each weld joint 340 is encompassed within the corresponding one of the joining regions 330.

Figure 4:
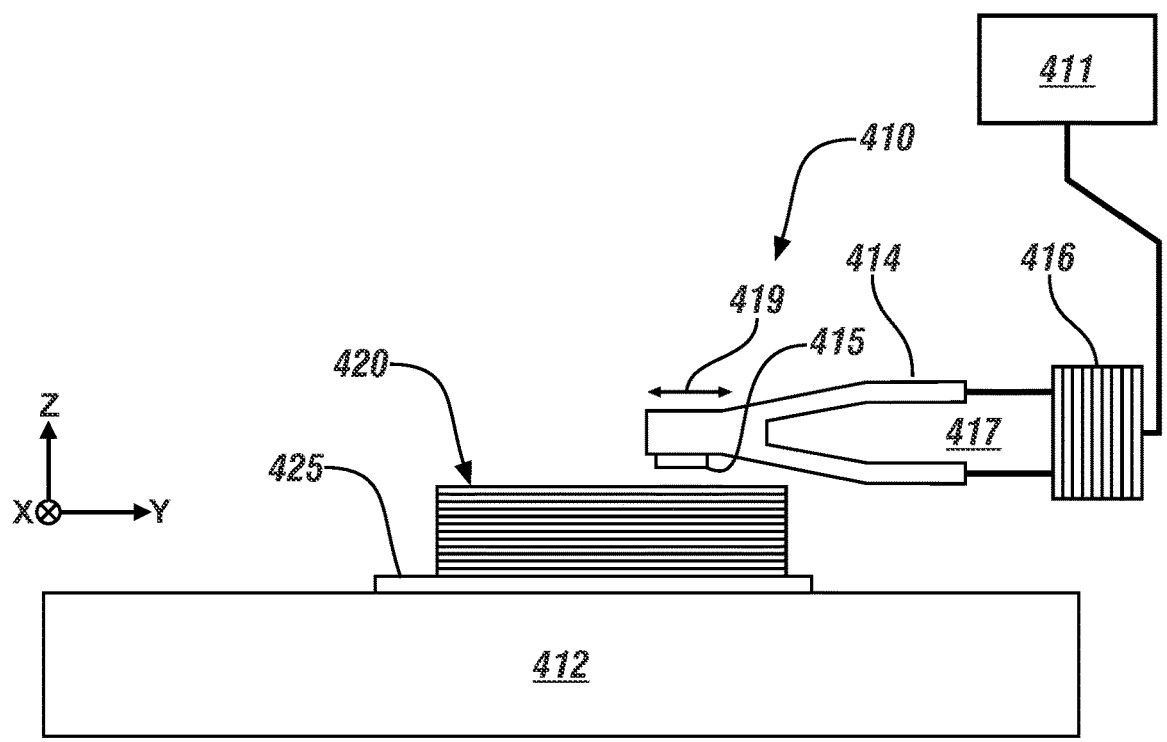
FIG. 4 schematically shows elements of a vibration welding system for welding a battery tab to a plurality of foils arranged in a stack, in accordance with the disclosure.

FIG. 4 schematically illustrates an example vibration welding system 410 for ultrasonically welding the positive foils 28 of the cathode current collectors 27 that are illustrated with reference to FIGS. 1, 2 and 3. The vibration welding system 410 is configured for forming vibration-welded joints, using vibrational energy, e.g., ultrasonic vibration energy. Examples of the vibration-welded joints include the plurality of joining regions 30 described with reference to FIG. 2 and the plurality of joining regions 330 described with reference to FIG. 3. Other examples of the vibration-welded joints are illustrated and described with reference to FIGS. 9A through 9C.

Referring again to FIG. 4, the vibration welding system 410 includes an actuator in the form of the welding horn 414, and an anvil assembly 412 in one embodiment. The welding horn 414 may also be referred to as a vibrating sonotrode. The vibration welding system 410 preferably operates in an ultrasonic frequency range, although other vibration frequency ranges may be employed without departing from the intended scope of the concepts described herein.

The anvil assembly 412 provides a relatively static mass of metal sufficient for opposing the welding horn 414 during operation of the vibration welding system 410. The welding horn 414 is disposed to apply compressive pressure to the workpiece 420 against the anvil assembly 412 as part of the welding process. In one embodiment, the workpiece 420 includes the first stack 14 that is composed of the positive foils 28 of the cathode current collectors 27 that is illustrated with reference to FIGS. 1, 2 and 3.

Referring again to FIG. 4, the welding horn 414 may include one or a plurality of welding pads 415 that are disposed to face the workpiece 420 that is to be welded. The welding pad 415 may have a knurled surface that includes raised bumps or ridges, or another suitable surface configuration. The surface of the welding pad 415 physically contacts the workpiece 420 during the vibration welding process. The anvil assembly 412 may likewise have similar anvil pads 425. The welding pad 415 and the anvil pad 425 serve to grip the workpiece 420 during the vibration welding process.

The welding horn 414 couples to a booster 417 and a piezoelectric stack 416, and a controller 411 is operatively connected to the piezoelectric stack 416. The piezoelectric stack 416 is a vibrational energy input device. The welding horn 414 may be caused to vibrate by activation of the piezoelectric stack 416 in response to a sinusoidal or another repetitive oscillating signal that is provided from the controller 411. As is understood in the art, piezoelectric materials are electromechanical materials that transform energy between mechanical and electric domains. Piezoelectric materials may be crystalline structures or ceramics that produce an output voltage signal in response to a mechanical stress. This effect also occurs in the reverse manner, i.e., a mechanical displacement or strain is induced in response to a fixed or oscillating voltage input that is applied to a sample piezoelectric material. For example, activation of a given piezoelectric material may result in a change in dimension of approximately 0.1% for piezo-ceramics and approximately 41% for piezo-polymers. As such, the piezoelectric stack 416 may vibrate in response to the repetitive oscillating signal provided from the controller 411, and the vibration may be propagated through the booster 417 to the welding pad 415 of the welding horn 414. The direction of the induced vibration is indicated by arrow 419.

Figure 5:
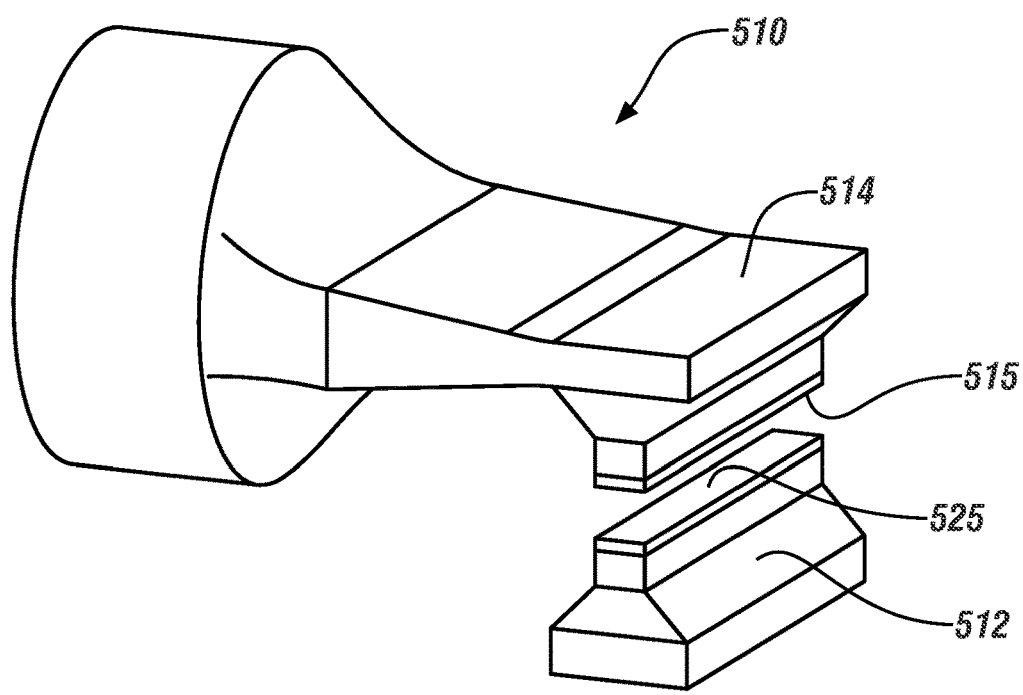
FIG. 5 pictorially shows an embodiment of a vibration welding system for welding a battery tab to a plurality of foils arranged in a stack, in accordance with the disclosure.
Figure 6:
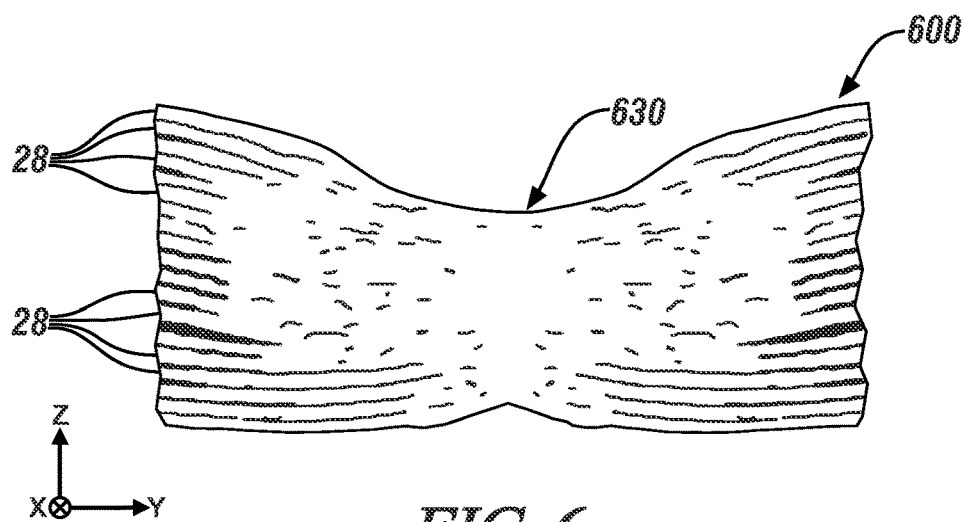
FIG. 6 pictorially shows an intermediate workpiece that includes a plurality of foils arranged in a stack that have been joined by a vibration welding system, in accordance with the disclosure.

FIG. 5 schematically illustrates one embodiment of a vibration welding system 510 that is configured to and capable of forming joining regions such as the plurality of joining regions 30 described with reference to FIG. 2 and the plurality of joining regions 330 described with reference to FIG. 3. Example embodiments of the vibration-welded joints 40 are also illustrated and described with reference to FIGS. 9A through 9C. The vibration welding system 510 includes an anvil 512, a welding horn 514 or sonotrode, a welding pad 515, and an anvil pad 525. The welding pad 515 and anvil pad 525 are rectangularly-shaped, with a major axis that is transverse to a longitudinal axis defined by the welding horn 514. The welding horn 514 includes one or a plurality of welding pads 515 that are disposed to face a workpiece (not shown) that is to be welded, e.g., the plurality of positive foils 28 of the plurality cathode current collectors 27 that are illustrated with reference to FIGS. 1, 2 and 3. The welding pad 515 may have a knurled surface that includes raised bumps or ridges, or another surface configuration. The surface of the welding pad 515 physically contacts the workpiece during the vibration welding process to form the joining regions. FIG. 6 pictorially shows a cross-section of an example intermediate workpiece 600 including a joining region 630. The intermediate workpiece 600 is composed of the first stack 14 having the plurality of positive foils 28 of the plurality cathode current collectors 27 that are illustrated with reference to FIGS. 1, 2 and 3, after vibration welding by the vibration welding system 510 that is described with reference to FIG. 5. The ultrasonic joining process by the vibration welding system 510 removes absorbed moisture and surface oxides, and compresses, consolidates, and concentrates the foils of the plurality of positive foils of the plurality of cathode current collectors to form the joining region 630. The intermediate workpiece 600 formed thereby may include a single joining region 630 (as shown), or a plurality of joining regions 630.

Figure 7A:
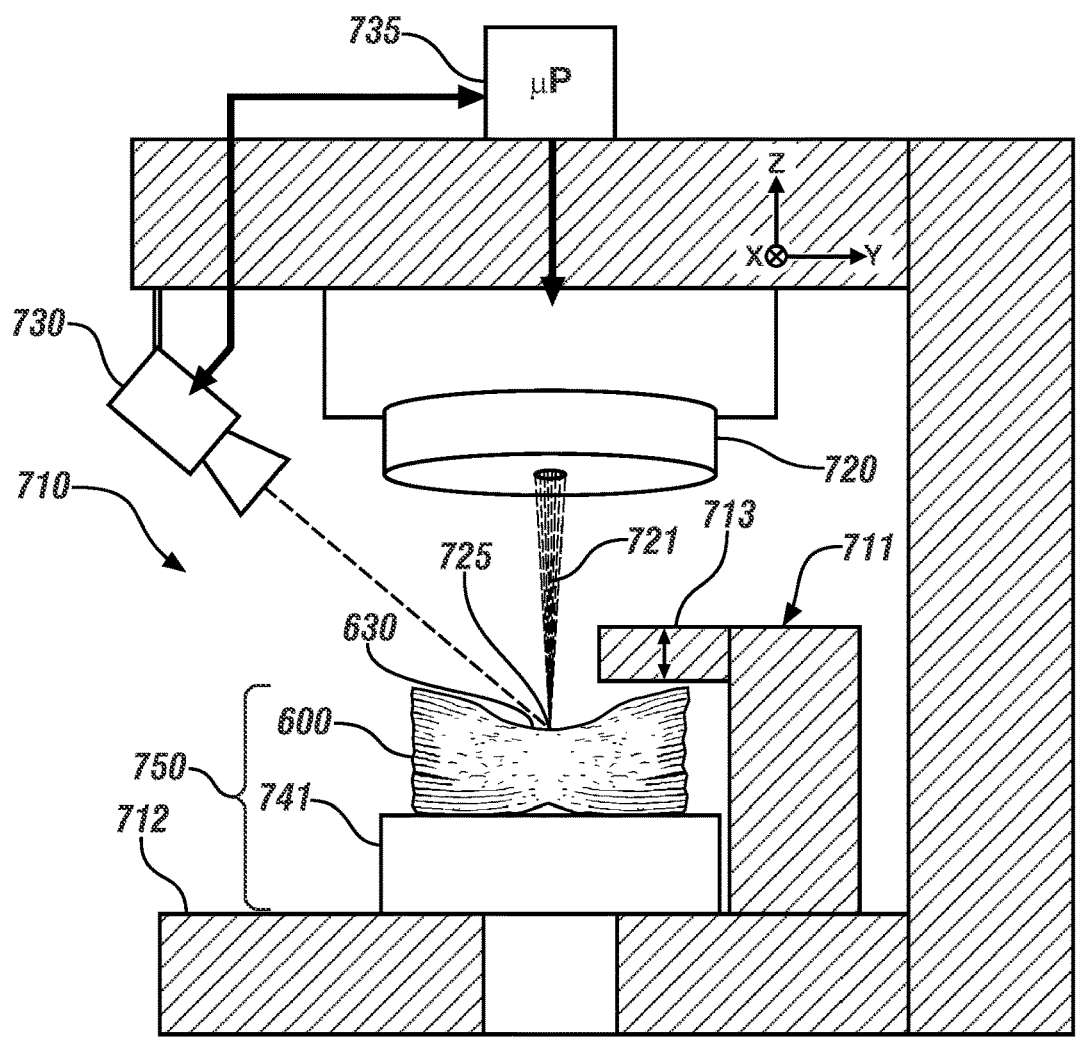
FIG. 7A schematically shows elements of a laser welding system for welding a first arrangement of a battery tab and a plurality of foils arranged in a stack, in accordance with the disclosure.
Figure 7B:
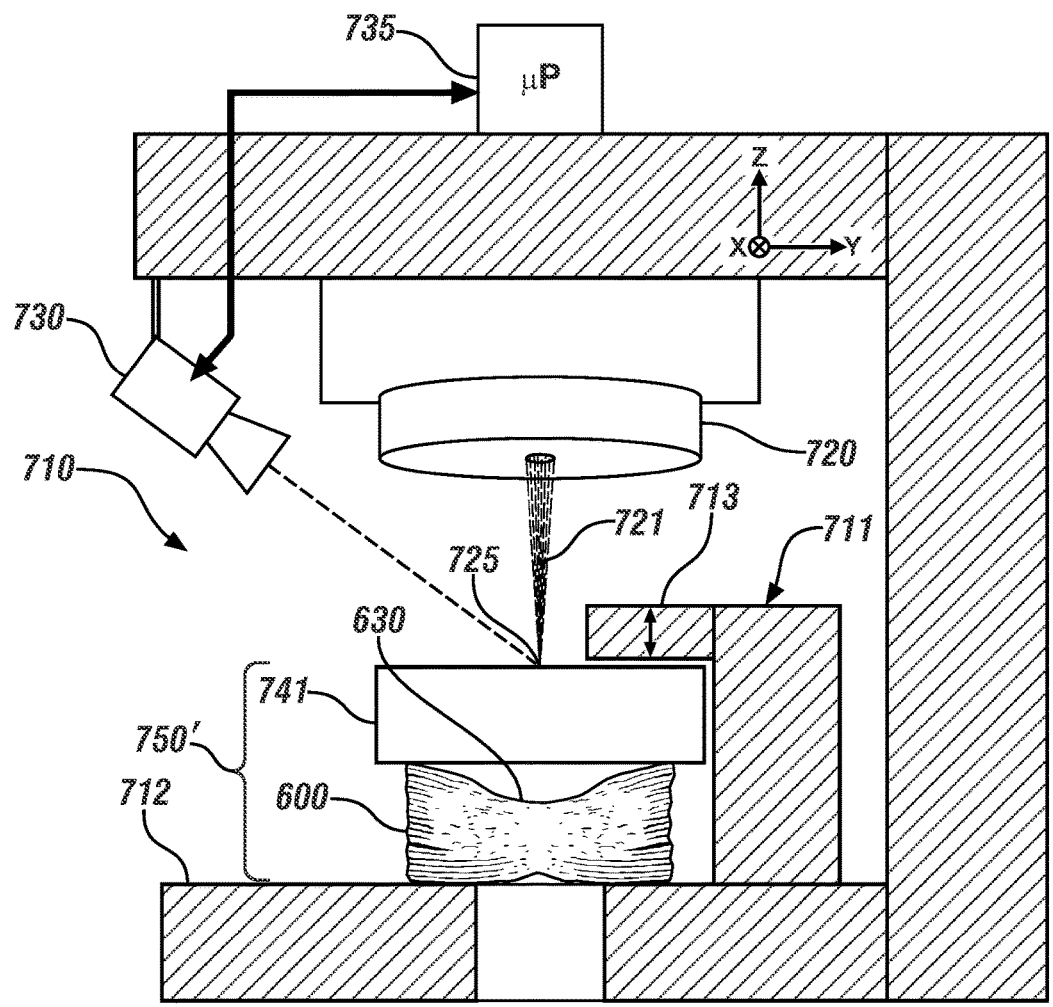
FIG. 7B schematically shows elements of a laser welding system for welding a second arrangement of a battery tab and a plurality of foils arranged in a stack, in accordance with the disclosure.

FIGS. 7A and 7B schematically illustrate a second joining device in the form of a laser welding system 710, which is composed with a laser welder 720, a locating system 730, and controller 735. The laser welding system 710 is arranged to act upon a workpiece 750, 750' that includes a battery cell tab 741, e.g., either the first battery cell tab 29 or the second battery cell tab 24 described with reference to FIG. 1, and the intermediate workpiece 600 that is described with reference to FIG. 6, wherein the intermediate workpiece 600 has one or a plurality of joining regions 630. The intermediate workpiece 600 includes the first stack 14 that is composed of the plurality of positive foils 28 of the plurality of cathode current collectors 27 that are illustrated with reference to FIGS. 1, 2 and 3, after vibration welding by the vibration welding system 510 that is described with reference to FIG. 5.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/ output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

As illustrated with reference to FIG. 7A, the laser welding system 710 is arranged to act upon workpiece 750 that includes the battery cell tab 741 positioned underneath the intermediate workpiece 600 relative to the laser welder 720. As illustrated with reference to FIG. 7B, the laser welding system 710 is arranged to act upon workpiece 750' that includes battery cell tab 741 positioned overtop of the intermediate workpiece 600 relative to the laser welder 720.

Referring again to FIGS. 7A and 7B, the locating system 730 includes a machine vision system or a computer vision system having a vision sensor and a microprocessor with algorithms that are arranged to monitor and evaluate the intermediate workpiece 600 to identify and locate spatial locations of the plurality of joining regions 630 that are formed thereon. The locating system 730 communicates the spatial locations of the plurality of joining regions 630 to the laser welder 720, which is controlled based thereon in relation to a reference location. The spatial locations of the plurality of joining regions 630 include locations in the xy-plane that are identified on an upper surface of the plurality of foils arranged in the stack of foils of the intermediate workpiece 600. In one embodiment, the locating system 730 includes laser scanner optics mounted directly on the laser welder 720.

The laser welder 720 is a solid-state device that generates, focuses and directs a laser beam 721, including being advantageously disposed to direct the laser beam 721 at a top surface of the first battery cell tab 29 when the intermediate workpiece 600 is secured in the laser welding system 710. In one embodiment, the laser welder 720 may be mounted in a fixture and controlled by a controller 735 to quickly and accurately focus the laser welder 720 on a predetermined weld site to form a second weld joint in response to programmed inputs, wherein the preselected weld site corresponds to one of the plurality of joining regions 630 on the intermediate workpiece 600 and has been discerned or otherwise detected by the locating system 730.

The laser beam 721 is a solid-state laser beam and, in particular, a fiber laser beam or a disk laser beam operating with a wavelength in the near-infrared range (commonly considered to be 700 nm to 2900 nm) of the electromagnetic spectrum. In one embodiment, the laser beam may be an optical fiber doped with rare-earth elements (e.g., erbium, ytterbium, neodymium, dysprosium, praseodymium, thulium, etc.) or a semiconductor associated with a fiber resonator. Alternatively, a disk laser beam may be employed, which includes a laser beam in which the gain medium is a thin disk of ytterbium-doped yttrium-aluminum garnet crystal that is coated with a reflective surface and mounted to a heat sink.

The laser welding system 710 also includes, in one embodiment, a clamping mechanism 711 that is composed of an anvil 712 and an opposed clamp 713 that are advantageously arranged to apply compressive force to the intermediate workpiece 600 and the battery cell tab 741 to mechanically clamp and thus hold the workpiece 750 in position to effect fusion welding with the laser welder 720. The anvil 712 includes a cutout portion directly beneath the laser welder 720, and the workpiece 750 is moved and placed on the anvil 712 with one of the joining regions 630 overtop of the cutout portion, which allows the laser beam 721 to pass therethrough while avoiding welding of the workpiece 750 to the anvil 712.

As shown with reference to FIG. 7A, the laser beam 721 impinges on the top surface of the intermediate workpiece 600 within one of the joining regions 630 and imparts localized heat to effect fusion welding of the intermediate workpiece 600 and the battery cell tab 741, and thus form a weld joint 740. In one embodiment, the laser beam 721 may be controlled to a defocusing distance or focal point of −1.5 mm, i.e., a defocusing distance that is 1.5 mm below the top surface of the intermediate workpiece 600, with an attendant beam spot diameter of 0.6 mm. The example laser power levels and duty cycles stated herein may be selected specifically for use with copper alloys or aluminum alloys, and may be adjusted based upon physical properties of the selected materials for the workpieces to be welded by the laser welder 720.

Figure 8A:
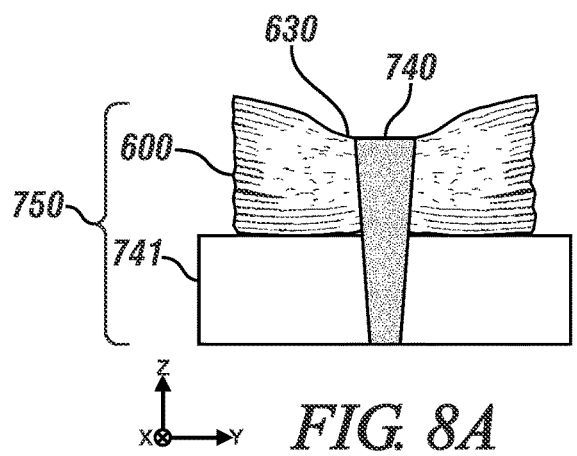
FIG. 8A pictorially shows a first arrangement of a battery tab and a plurality of foils arranged in a stack that have been joined by a laser welding system, in accordance with the disclosure.

Referring again to FIG. 7A, the laser welder 720 is employed to generate the laser beam 721 that is applied to the top of the intermediate workpiece 600 of the workpiece 750 to generate a laser weld joint 740 along a weld path 725 that is defined within and circumscribed by the joining region 630. The joining region 630 and the weld path 725 project into the Figure in the x-dimension. Examples of weld paths that may be generated by the laser welder 720 are illustrated with reference to FIGS. 9A-9C. FIG. 8A schematically illustrates an example of the laser weld joint 740.

Referring again to FIG. 7B, the laser welder 720 is employed to generate the laser beam 721 that is applied to the top of the battery cell tab 741 of the workpiece 750 to generate a laser weld joint 740' along a weld path 725 that is defined within and circumscribed by the joining region 630 of the intermediate workpiece 600. The joining region 630 and the weld path 725 project into the Figure in the x-dimension.

Figure 8B:
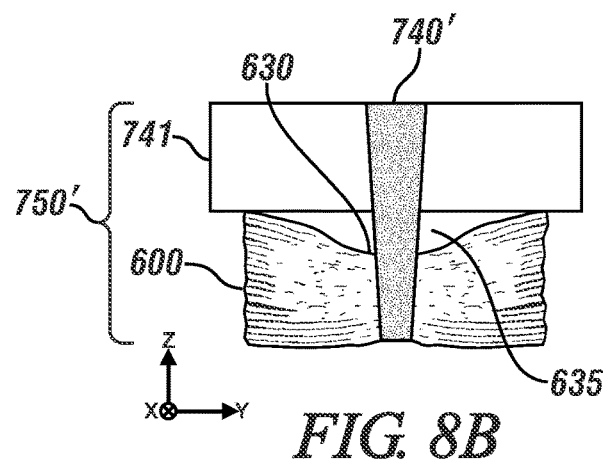
FIG. 8B pictorially shows a second arrangement of a battery tab and a plurality of foils arranged in a stack that have been joined by a laser welding system, in accordance with the disclosure.

FIG. 8B schematically illustrates the workpiece 750' with the battery cell tab 741 being placed overtop of the intermediate workpiece 600 in relation to the laser beam 721. When the laser weld joint 740' is generated by the laser, as described with reference to FIG. 7B, a void region 635 is formed and defined by the battery cell tab 741 and the joining region 630. The void region 635 serves as and functions as a conduit that enables venting and escape of dissolved welding gases and other gases during welding and in-use, for porosity reduction.

Examples of weld paths that may be generated by the laser welder 720 are illustrated with reference to FIGS. 9A-9C and are shown in an xy-plane.

Figure 9A:
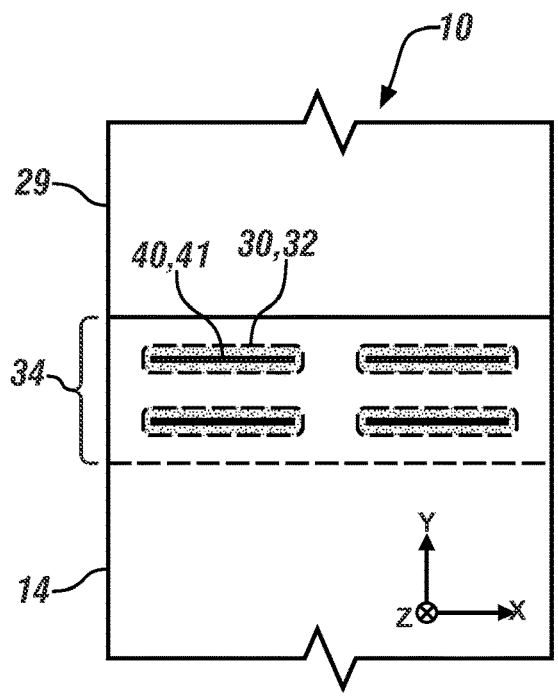
FIGS. 9A-9C pictorially show a top view of an arrangement of a battery tab and a plurality of foils arranged in a stack that have been joined by a vibration welding system and welded by a laser welding system, in accordance with the disclosure.
Figure 9B:
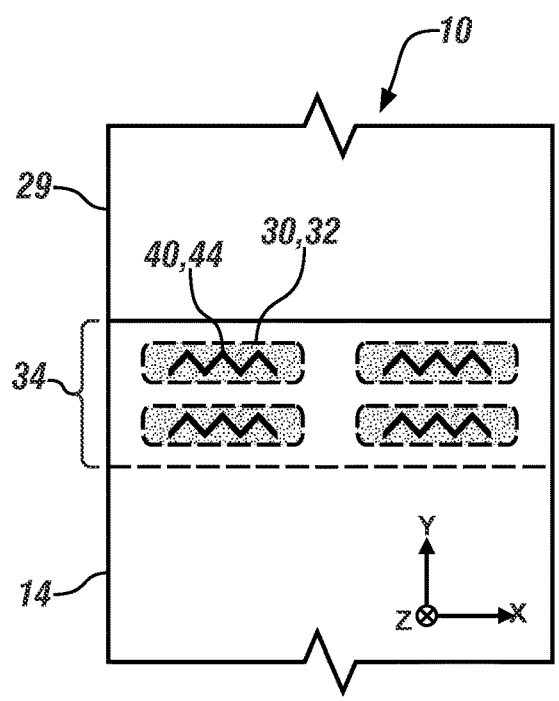
Figure 9C:
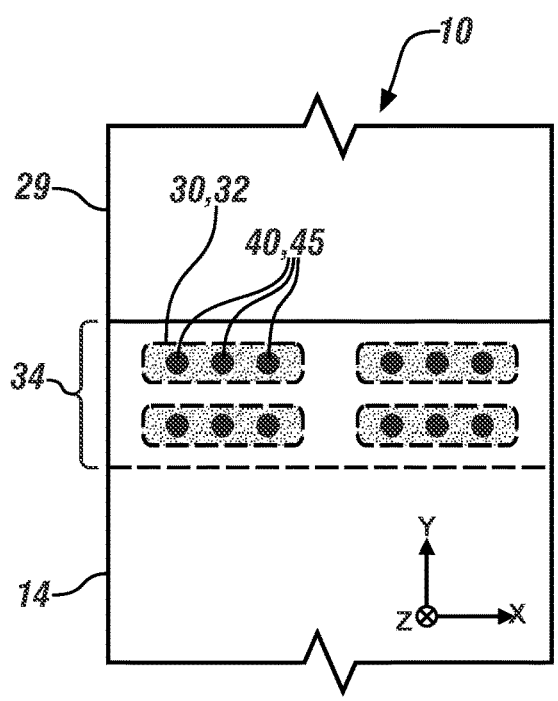

FIGS. 9A-9C illustrate, in the xy-plane, a plurality of laser-generated weld joints that may be employed to join a battery cell tab 29 and the first stack 14 that is composed of the plurality of positive foils 28 of the plurality cathode current collectors 27 that are illustrated with reference to FIGS. 1, 2 and 3, wherein the laser-generated weld joints are encompassed within the joining regions formed by and defined by the first joining device.

FIG. 9A illustrates a top view of the battery cell tab 29 placed overtop of the first stack 14 with an overlap portion 34. The first stack 14 is composed of the plurality of positive foils 28 of the plurality cathode current collectors 27. A plurality of first joining regions 30 having substantially rectangular shapes 32 are shown, and are defined by and formed by an embodiment of the vibration welding system 410 described with reference to FIG. 4. A corresponding plurality of laser-generated weld joints in the form of continuous weld seams 41 are also shown, and are defined by and formed by the laser welding system 710 described with reference to FIG. 7. In this embodiment each of the continuous weld seams 41 is a continuous straight line seam weld joint that is encompassed within the first joining region 30 and extends from a first end to a second end of the first joining region 30 parallel to its major axis. Alternatively, each of the continuous weld seams 41 is a continuous straight line seam weld joint that is encompassed within the first joining region 30 and extends between a first end and a second end of the first joining region 30 parallel to its major axis, without extending to the first end and the second end.

Alternatively, each of the weld seams 41 is a discontinuous straight line seam weld joint that is encompassed within the first joining region 30 and extends between a first end and a second end of the first joining region 30 parallel to the major axis of the rectangular shape 32.

FIG. 9B illustrates a top view of the battery cell tab 29 placed overtop of the first stack 14 with an overlap portion 34. The first stack 14 is composed of the plurality of positive foils 28 of the plurality cathode current collectors 27. A plurality of first joining regions 30 having substantially rectangular shapes 32 are shown, and are defined by and formed by an embodiment of the vibration welding system 410 described with reference to FIG. 4. A corresponding plurality of laser-generated weld joints in the form of continuous weld seams 44 are also shown, and are defined by and formed by the laser welding system 710 described with reference to FIG. 7. In this embodiment each of the continuous weld seams 44 is a waveform seam weld joint that is encompassed within the first joining region 30 and extends between a first end and a second end of the first joining region 30 parallel to its major axis. In one embodiment, and as shown, the waveform continuous weld seam 44 has a sawtooth arrangement. Alternatively, the waveform continuous weld seam 44 may be composed as an elliptical wobble on a straight path, a sine wave, or another shape that is achievable by a galvanometer laser scanner.

FIG. 9C illustrates a top view of the battery cell tab 29 placed overtop of the first stack 14 with an overlap portion 34. The first stack 14 is composed of the plurality of positive foils 28 of the plurality cathode current collectors 27. A plurality of first joining regions 30 having substantially rectangular shapes 32 are shown, and are defined by and formed by an embodiment of the vibration welding system 410 described with reference to FIG. 4. A corresponding plurality of laser-generated weld joints in the form of spot welds 45 are also shown, and are defined by and formed by the laser welding system 710 described with reference to FIG. 7. In this embodiment each of the spot welds 45 is a spiral spot weld joint that is encompassed within the first joining region 30.

Overall, localized material voids, which may be manifested as gaps between layers in a workpiece stack and/or as voids in one or more of the workpieces may affect service life of the weld joint, and hence may affect service life of the component that includes the weld joint. When the workpiece stack includes a plurality of foils that are welded to a battery tab, the occurrence of localized material voids may affect electrical conductivity between one or more of the foils and the battery tab. The concepts described herein, including the arrangements of the workpiece stacks and the associated laser welding processes reduce occurrences of localized material voids and/or gaps, thus reducing part-to-part variability, achieving design-intent electrical conductivity levels, and improving service life.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for joining a battery cell tab to a plurality of foils associated with a plurality of electrodes of a battery cell, the method comprising:
   arranging the plurality of foils in a stack;
   joining, via a first joining device, the plurality of foils, wherein the first joining device defines a joining region;
   arranging a portion of the battery cell tab on the plurality of foils; and
   joining, via a second joining device, the portion of the battery cell tab to the plurality of foils, wherein the second joining device generates a weld joint;
   wherein the weld joint generated by the second joining device is encompassed within the joining region defined by the first joining device.

2. The method of claim 1, wherein joining, via the first joining device, the plurality of foils comprises ultrasonically welding the plurality of foils.

3. The method of claim 2, wherein ultrasonically welding the plurality of foils comprises placing the plurality of foils arranged in the stack on an anvil, clamping the plurality of foils arranged in the stack, and applying, via an ultrasonic welding horn, ultrasonic force to the plurality of foils arranged in the stack to form the joining region.

4. The method of claim 1, further comprising:
   identifying, via a vision system, the joining region on the plurality of foils arranged in the stack; and
   determining a spatial location of the joining region on the plurality of foils arranged in the stack;
   wherein the weld joint generated by the second joining device is encompassed within the spatial location of the joining region defined by the first joining device.

5. The method of claim 1, wherein the joining region defined by the first joining device comprises a rectangular area.

6. The method of claim 1, wherein joining, via the second joining device, the portion of the battery cell tab to the plurality of foils comprises welding, via a laser welder, the portion of the battery cell tab to the plurality of foils to generate the weld joint.

7. The method of claim 6, wherein a top surface of the battery cell tab is proximal to the laser welder, and wherein welding, via the laser welder, the portion of the battery cell tab to the plurality of foils to generate the weld joint comprises generating, via the laser welder, a laser beam that is directed within the joining region defined by the first joining device to form the weld joint joining the foils and the battery cell tab.

8. The method of claim 1, wherein the weld joint generated by the second joining device comprises a seam weld that is encompassed within the joining region defined by the first joining device.

9. The method of claim 8, wherein the seam weld comprises a continuous straight line seam weld joint that is encompassed within the joining region defined by the first joining device.

10. The method of claim 8, wherein the seam weld comprises a waveform seam weld joint that is encompassed within the joining region defined by the first joining device.

11. The method of claim 1, wherein the weld joint generated by the second joining device comprises at least one spot weld that is encompassed within the joining region defined by the first joining device.

12. The method of claim 1, wherein arranging the portion of the battery cell tab on the plurality of foils comprises arranging the portion of the battery cell tab to be overtop of the plurality of foils in relation to the second joining device.

13. The method of claim 1, wherein arranging the portion of the battery cell tab on the plurality of foils comprises arranging the portion of the battery cell tab underneath the plurality of foils.

14. The method of claim 1, further comprising forming a void region between the battery cell tab and the plurality of foils at the joining region.

15. A method for joining a plurality of foils associated with a plurality of electrodes of a battery cell and a battery cell tab, the method comprising:
 arranging the plurality of foils in a stack;
 joining, via vibration welding, the plurality of foils, wherein the vibration welding defines a plurality of joining regions;
 arranging a portion of the battery cell tab on the plurality of foils; and
 joining, via a second joining device, the portion of the battery cell tab to the plurality of foils, wherein the second joining device generates a plurality of weld joints;
 wherein each of the plurality of weld joints generated by the second joining device is encompassed within a respective one of the plurality of joining regions defined by the vibration welding.

16. The method of claim 15, further comprising:
 identifying, via a vision system, the plurality of the joining regions on an upper surface of the plurality of foils arranged in the stack;
 determining a plurality of spatial locations for the plurality of the joining regions on an upper surface of the plurality of foils arranged in the stack; and
 welding, via a laser welder, the portion of the battery cell tab to the plurality of foils to generate the plurality of weld joints, wherein each of the plurality of weld joints is encompassed within a respective one of the plurality of the spatial locations for the plurality of the joining regions on the upper surface of the plurality of foils arranged in the stack.

17. The method of claim 15, wherein each of the weld joints generated by the second joining device forms a void region between the battery cell tab and the plurality of foils at each of the plurality of joining regions.

* * * * *